No. 892,137. PATENTED JUNE 30, 1908.
H. F. CRANDALL.
FISHING REEL.
APPLICATION FILED DEC. 7, 1907.
3 SHEETS—SHEET 1.
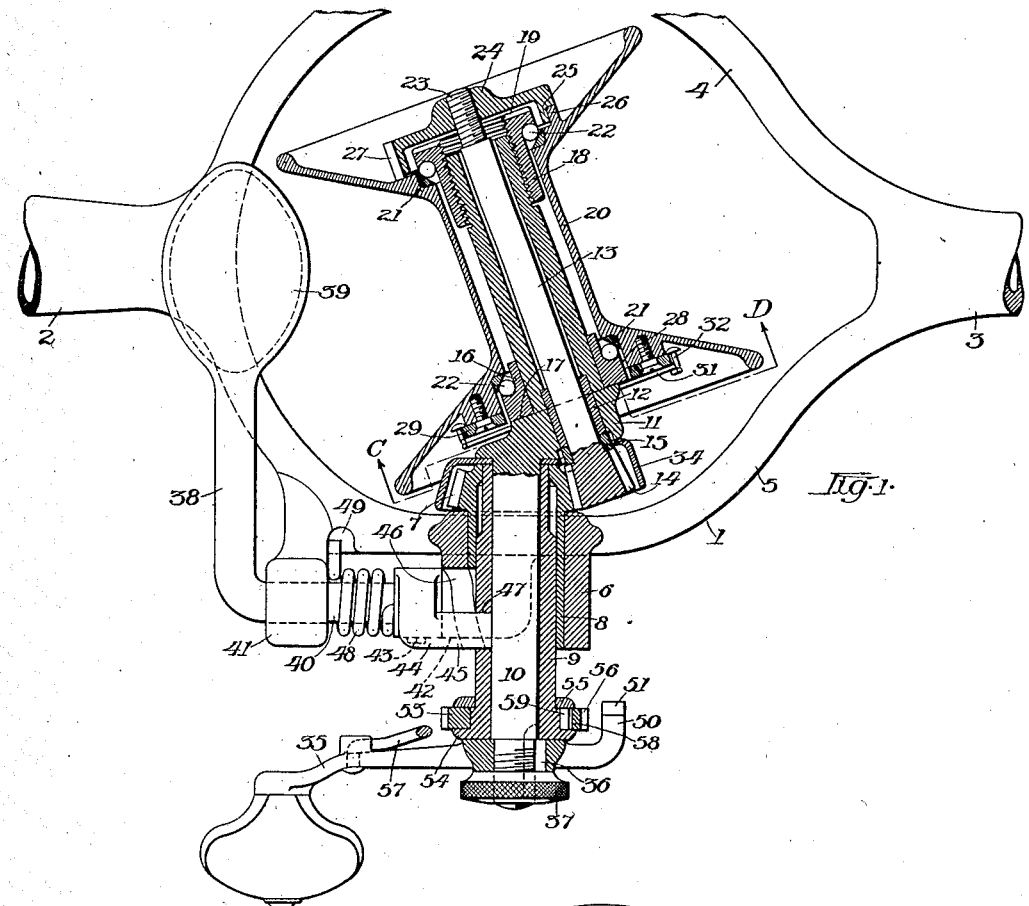
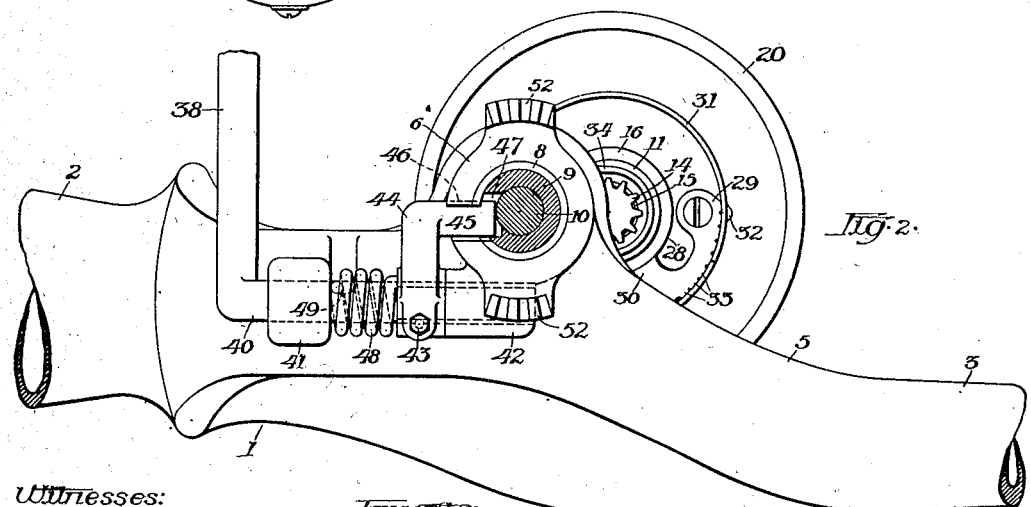
Witnesses:
J. N. Daggett
F. W. Hoffmeister
Inventor:
Henry F. Crandall
By C. W. Burges
Attorney

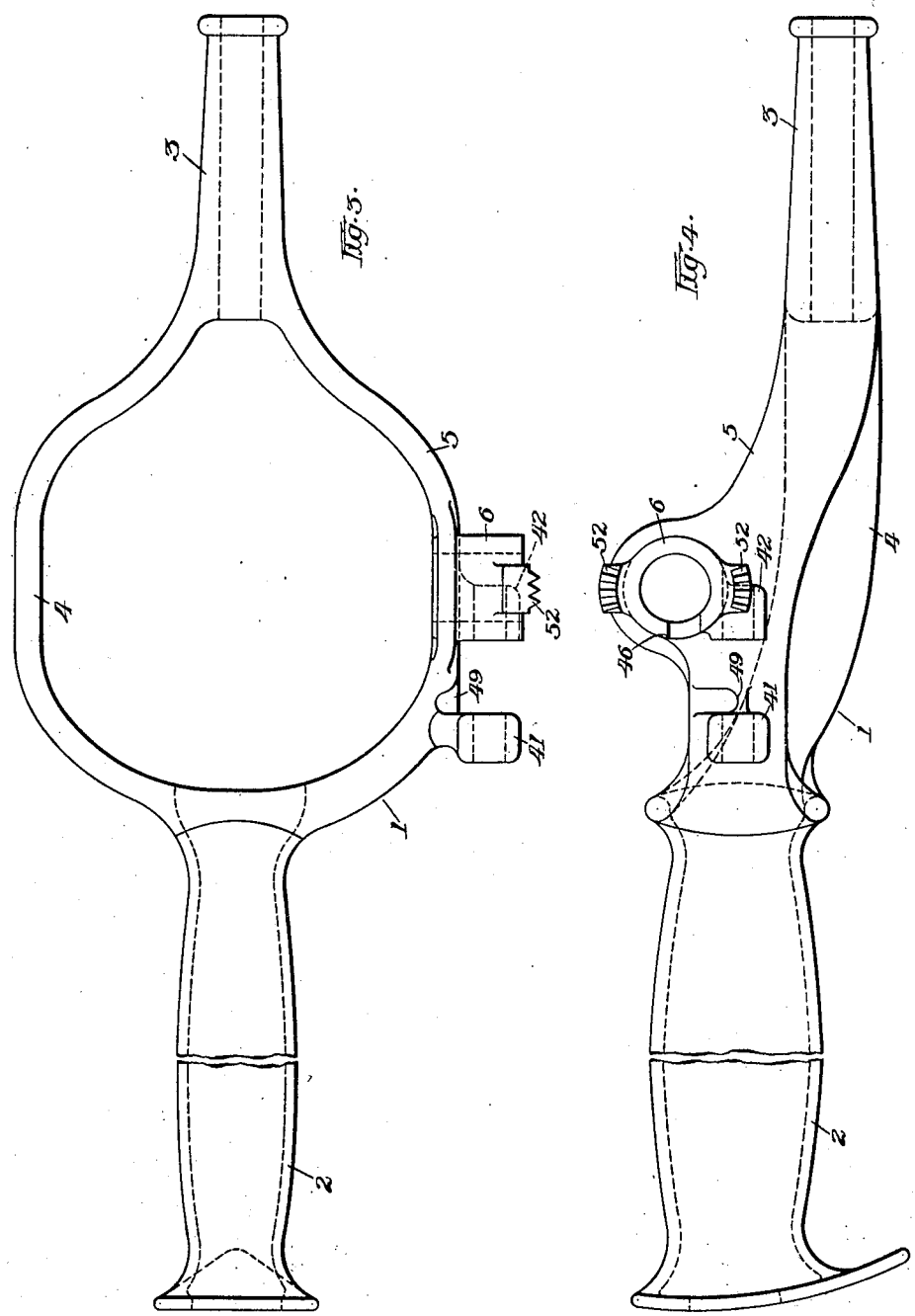

No. 892,137. PATENTED JUNE 30, 1908.
H. F. CRANDALL.
FISHING REEL.
APPLICATION FILED DEC. 7, 1907.
3 SHEETS—SHEET 3.
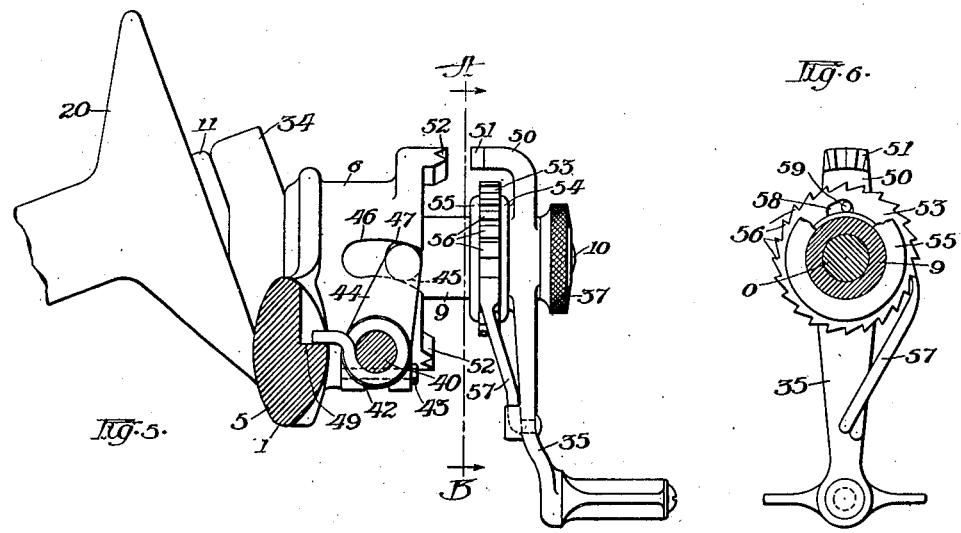
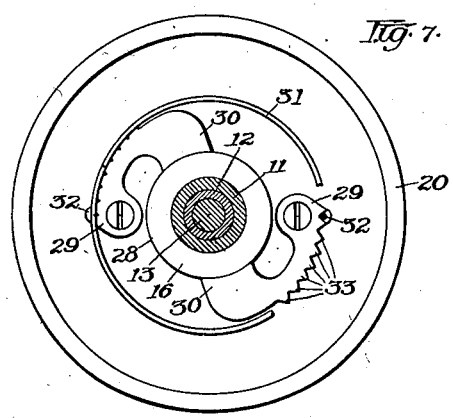
Witnesses:
J. N. Daggett
F. W. Hoffmeister
Inventor
Henry F. Crandall
By E. W. Burges
Attorney

UNITED STATES PATENT OFFICE.

HENRY F. CRANDALL, OF MILWAUKEE, WISCONSIN.

FISHING-REEL.

No. 892,137.　　　Specification of Letters Patent.　　　Patented June 30, 1908.

Application filed December 7, 1907. Serial No. 405,504.

*To all whom it may concern:*

Be it known that I, HENRY F. CRANDALL, a citizen of the United States, residing at Milwaukee, in the county of Milwaukee and State of Wisconsin, have invented certain new and useful Improvements in Fishing-Reels, of which the following is a specification.

My invention relates to fishing reels that are mounted upon the "butt piece" of the fishing rod as a support for the same, and its objects are to provide an improved construction of the reel and also a combined "butt piece" and reel support, the whole forming a complete and convenient mechanism that may be readily manipulated by the operator. I attain these objects by the mechanism illustrated in the accompanying drawing, in which—

Figure 1 represents a plan view, partly in section, of the reel and a portion of the butt piece upon which the reel is mounted. Fig. 2 represents a side elevation of Fig. 1. Fig. 3 represents a top plan view of the "butt piece," showing the hand piece therefor as being shortened for convenience of illustration. Fig. 4 represents a side elevation of Fig. 3. Fig. 5 represents a detached detail, partly in section, of the "butt piece" and a portion of the reel actuating mechanism. Fig. 6 represents a section of Fig. 5 on line A—B and in the direction of the arrows; and Fig. 7 represents a section on line C—D of Fig. 1 and in the direction of the arrows.

Like reference numerals designate the same parts throughout the various views.

Referring to the drawings, 1 represents a butt piece having a handle portion 2, and a rod receiving socket 3, the latter being in a lower plane than the handle portion, and intermediate the two ends is a skeleton frame having side members 4 and 5 that are outwardly curved in a manner adapting them to receive therebetween a part of the reel mechanism and form a support for the same. Integral with the member 5 is a sleeve portion 6, the axial line thereof being above that of the socket 3 for the purpose of permitting a free movement of the line without material deflection thereof, and 7 represents a fixed gear provided with a laterally extended thimble portion 8 that is received by the sleeve 6, and the thimble is secured against rotation therein by means that will be described later.

A sleeve 9 is received by the thimble 8 in a manner to slide longitudinally therein and through an axial opening in gear 7; and 10 represents a spindle journaled in the sleeve 9 and forming part of a spool carrying member 11 that is angularly disposed relative to the said spindle.

The spool carrying member 11 is provided with an axial bore having at one end a thimble 12 which forms a bearing for the inner end of a spindle 13, said spindle being provided with a pinion 14 that is adapted to engage with the fixed gear 7 and be driven thereby; a washer 15 being interposed between the pinion and the adjacent end of the thimble 12.

A closely fitting collar 16 is placed upon the inner end of the spool carrying member 11 is rigid therewith and rests against a shoulder 17 formed upon said member, and 18 represents a threaded thimble received by the outer end of the member 11, which thimble is provided at its outer end with projecting ribs 19 as means whereby the thimble may be adjusted relative to member 11.

20 designates the spool which is similar in its exterior form to those common in its class, and is provided with hardened steel rings 21 that are received by suitably formed counterbores at opposite ends of said spool; the rings being provided with outer angular faces that coöperate with curved faces upon the collar 16 and thimble 18 to form ball races for the reception of balls 22; the thimble 18 being adjustable upon member 11 in a manner to compensate for any wear of the bearing surfaces.

The outer end of spindle 13 is provided with a reduced portion 23 that is threaded to receive a cap-plate 24, said plate having an inwardly projecting annular flange 25 that is received within a similar flange 26 forming part of the spool, and 27 represents a pin passing through the outer edge of the plate and engaging with an opening in flange 26 in a manner to lock the two parts together.

The collar 16 is provided with a bearing surface 28 that projects beyond the inner end of the spool, and 29 designates segmental brake members having one end pivotally connected with the spool and their opposite ends provided with curved shoe portions 30 adapted to engage frictionally with the bearing surface 28 when said brake members are moved inward about their pivots. The shoes are normally held in yielding contact with the bearing surface by means of a spring member 31, that, in its preferred form, consists in a ring formed of wire and having laterally extending studs 32 integral therewith; which studs are adapted to engage with teeth 33 formed upon the outer edges of the brake members 29, said outer edges being formed concentric with the axis of the spool, and the studs are provided with enlarged head portions that overlap the ends of the teeth in a manner to retain the ring in position. The normal diameter of the ring is less than that represented by the radial distance of the concentric edges of the brake members from the axis of the spool, and to place the ring in operative position it is by means of pressure thereon caused to assume an oval form with its greater diameter in the direction of the studs, when it may be adjusted to engage with any of the teeth upon the brake members for the purpose of determining the degree of pressure of the brake shoes, and when released from pressure its resiliency will cause it to seek its normal shape and thereby engage with the brake members in a manner to yieldingly hold the shoes in contact with the surface of the opposing member of the brake mechanism.

A cup shaped shield 34 is mounted upon the inner end of the spindle 10 and rotates therewith; the gear 7 and pinion 14 being partially inclosed by said shield.

35 represents a crank arm secured to the outer end of spindle 10 by means of a key 36 and nut 37. When the spindle 10 is caused to rotate by means of the crank arm, the spool carrying member 11 is rotated thereby and the pinion 14 is carried around the gear 7 and, being rotated thereby, imparts a rotative movement to the winding spool 20 through spindle 13 and cap plate 24; the axis of the spool being angularly arranged relative to the axis of spindle 10, which axis, being on a line intercepting the axis of the spool intermediate its ends, the opposite ends of the spool will be given a gyratory movement as said spool is carried bodily around the fixed gear 7.

To disengage the pinion 14 from gear 7, the sleeve 9 is moved longitudinally through its bearing and carries with it spindle 10, spool support 11, its driving spindle 13 and pinion 14; the limit of such movement being reached when the pinion 14 is disengaged from gear 7, and the spool is left free to revolve independent of gear 7.

To control the movement of sleeve 9, I provide the following mechanism: A lever 38 is arranged substantially parallel with the spindle 10, with the inner end overhanging the butt piece and provided with a spoon-shaped portion 39, so located as to be convenient for manipulation by the thumb of the operator, and a crank-arm 40 arranged at right angles with the lever and mounted in bearings 41 and 42 forming part of side member 5 of the butt piece. Secured to the crank-arm by means of a clamping screw 43, and intermediate said bearings, is a lever-arm 44, having a crank-arm 45 integral therewith, and arranged substantially parallel with crank-arm 40. The arm 45 projects through a suitably formed slotted opening 46 in sleeve 6 and a similar opening in thimble 8, and is received by an opening 47 in the sleeve 9 thereby preventing rotation of the thimble and sleeve. A spring 48 is coiled about the crank-arm 40 between bearing 41 and lever-arm 44, one end of said spring engaging with a shelf portion 49 forming part of the side member 5, and the opposite end engaging with lever-arm 44; said spring being operative to turn said arm outward in a manner to move sleeve 9 in a direction to hold pinion 14 in engagement with gear 7. Pressure downward upon lever 38 will move arm 44 in an opposite direction and thereby move sleeve 9 in a manner to disengage the pinion and gear.

When the sleeve 9 and spindle 10 are moved to disengage the gears, the spindle and spool supporting member 11 are locked against rotation by means of an extension 50, forming part of crank-arm 35, said extension being provided with teeth 51 that are adapted to engage with opposing toothed surfaces 52 formed upon the outer end of sleeve 6, said surfaces 52 being arranged in opposite directions from the axial line of the sleeve in a manner to hold the crank arm 35 in a position at right angles with the butt piece when engaged with either of said toothed surfaces.

At the outer end of sleeve 9 there is mounted a disk 53 that is held against lateral movement thereon by means of a fixed collar 54 and an adjustable collar 55. The disk is provided with ratchet teeth 56 upon its periphery, and 57 represents a spring pawl having one end secured to crank-arm 35, and its opposite end adapted to engage with the ratchet teeth 56. Means are provided whereby the disk is allowed to rotate freely upon the sleeve 9 in one direction and to be locked against rotation in an opposite direction, said means consisting in a clutch mechanism arranged between the two parts; said clutch mechanism comprising a recess 58 formed in the disk adjacent its bearing and having its outer wall eccentric to the axis of the disk, and 59 represents a roller received by said recess and operative to clutch the disk upon its bearing when crank arm 35 is moved in one direction and to allow it to rotate freely thereon when said arm is moved in an opposite direction.

The operation of the mechanism is as follows: In winding the line upon the spool the latter is caused to rotate by means of the crank-arm 35 and spindle 10; the latter being integral with the spool support 11, carries it around the fixed gear 7, thereby imparting rotative movement to pinion 14 and spindle 13, and, through the cap-plate, to the spool which revolves upon its ball bearings. When it is desired to have the line unwind freely, as in casting, the lever 38 is pressed downward, and, by means of its associated parts, as before described, the spool and its driving pinion are moved bodily away from the fixed gear, and the rotation of the spool is unrestrained excepting by the operation of its associated brake mechanism, said mechanism being designed to automatically increase its frictional resistance as the speed of the spool decreases, owing to the increase of the effective action of the brake spring upon the brake shoes as influenced by the centrifugal force of the revolving brake members; which brake mechanism is very effective in preventing the spool from overrunning the line when the latter approaches the limit of the casting operation. When the line is out, pressure is released from lever 38, and under action of the spring connected therewith the spool driving mechanism becomes operatively connected with crank-arm 25, and may be operated thereby.

When the mechanism is adjusted as above indicated, and the line is subjected to strain enough to cause the spool, its supporting member and the spindle 10 connected therewith to rotate, the crank-arm 35 is caused to rotate in a direction opposite to that of its winding movement and the toothed disk 53, owing to the operation of the clutch mechanism connected therewith, becomes fixed against rotation relative to the sleeve upon which it is mounted and the spring pawl 57 overrides the teeth of the disk in a manner to produce an audible clicking sound for the guidance of the operator.

The mechanism whereby the spool may be rotated both axially and orbitally, and the means for suspending orbital rotation thereof, is similar in its construction to that shown and broadly claimed in my co-pending application for Letters Patent filed April 8, 1907, and having Serial Number 366,931.

What I claim as my invention, and desire to secure by Letters Patent, is:

1. A fishing reel having, in combination, a butt piece, a spool and spool operating mechanism, said butt piece having a skeleton frame, said frame comprising side members outwardly curved in a manner to receive a part of the reel mechanism therebetween, said spool and spool operating mechanism being mounted upon one of said side members only.

2. A fishing reel having, in combination, a butt piece, a spool and spool operating mechanism, said butt piece having a skeleton frame, said frame comprising side members outwardly curved in a manner to receive a part of the reel mechanism therebetween, one of said side members being provided with a sleeve portion, a thimble received by said sleeve, said thimble forming part of a fixed gear, a sleeve slidably received by said thimble, and a reel operating spindle journaled in said sleeve.

3. A fishing reel having, in combination, a spool and a spool support, spool operating mechanism, said mechanism including a longitudinally movable spindle mounted in said support, and a lever pivotally mounted upon said support and adapted to control a longitudinal movement of said spindle.

4. A fishing reel having, in combination, a spool and a spool support, spool operating mechanism, said mechanism including a longitudinally movable spindle mounted in said support, a lever pivotally mounted upon said support and operatively connected with said spindle in a manner to control a longitudinal movement thereof, and a spring operative to move said lever in one direction.

5. A fishing reel having, in combination, a spool and a spool support, a sleeve forming part of said support, spool operating mechanism, said mechanism including a fixed gear arranged coaxially with said sleeve and having an axial opening, a second sleeve received by said first mentioned sleeve and adapted to slide longitudinally therethrough and through said axial opening in said gear, a lever pivotally mounted upon said support, a crank-arm forming part of said lever, said first mentioned sleeve having an elongated slot, said crank-arm projecting through said slot and engaging with said second sleeve.

6. A fishing reel having, in combination, a spool and a spool operating mechanism, a support for said operating mechanism, said support comprising a butt-piece, said butt-piece having a hand-piece at one end, a rod receiving socket at its opposite end, and a skeleton frame intermediate its ends, said frame comprising outwardly curved side members adapted to receive therebetween said spool and a part of said operating mechanism, a sleeve integral with one of said side members, a fixed gear having an axial opening therethrough and a thimble portion received by said sleeve, a second sleeve received by said thimble and adapted to slide longitudinally therethrough and through the axial opening in said fixed gear, a spindle journaled in said second sleeve, a crank-arm secured to said spindle, a spool carrying member upon which said spool is rotatably mounted, a spindle journaled in said carrying member and secured to said spool, a pinion forming part of said spindle and adapted to engage with said fixed gear, means for disengaging said pinion and gear, said means comprising a lever arranged parallel with said longitudinally movable sleeve and overhanging said hand-piece, said lever having a crank-arm arranged at right angles with the body portion thereof, journal bearings forming part of said skeleton frame, said crank arm journaled in said bearings, a lever-arm secured to said crank-arm, said lever-arm having a crank-arm engaging with said longitudinally movable sleeve.

7. A fishing reel having, in combination, a spool carrying member, a spool rotatably mounted upon said carrying member, a brake mechanism mounted upon said spool and operative in connection with said carrying member to retard the rotation of said spool, said mechanism including brake members having one end pivotally connected with said spool and their opposite ends provided with shoe portions adapted to engage frictionally with said carrying member, and a spring connection between said brake members adapted to press said shoe portions frictionally against said carrying member.

8. A fishing reel having, in combination, a spool carrying member, a spool rotatably mounted upon said carrying member, a brake mechanism mounted upon said spool and operative in connection with said carrying member to retard the rotation of said spool, said mechanism including segmental brake members having one end pivotally connected with said spool and their opposite ends provided with shoe portions adapted to engage frictionally with said carrying member, said brake members having toothed surfaces substantially concentric with the axis of said spool, a spring connection between said brake members and adapted to engage with the toothed surfaces thereof in a manner to press said shoe portions frictionally against said carrying member.

9. A fishing reel having, in combination, a rotatable spool, a non-rotatable member means for rotating said spool, said means including a rotatable spindle journaled in said non-rotatable member, a crank-arm secured to said spindle, a toothed disk mounted upon said non-rotatable member, said disk being free to rotate in one direction thereupon, a clutch mechanism adapted to prevent rotation of the disk in an opposite direction, and a spring pawl having one end secured to said crank-arm and its opposite end adapted to engage with said toothed disk.

10. A fishing reel mechanism including, in combination, a butt piece having a hand piece at one end and a rod socket at its opposite end, the axial line of said socket being in a different plane than that of said hand piece, and means for mounting a reel intermediate said socket and hand piece.

11. A fishing reel having, in combination, a spool carrying member, a spool rotatably mounted upon said carrying member, a brake mechanism mounted upon said spool and operative in connection with said carrying member to retard the rotation of said spool, said brake mechanism including one or more brake members yieldingly pressed in frictional engagement with said carrying member, the pressure being automatically released as the rotative movement of the spool increases.

12. A fishing reel having, in combination, a rotatable spool, means for rotating said spool, said means including a rotatable and a non-rotatable member, a toothed disk mounted upon said non-rotatable member, said disk being free to rotate in one direction thereupon, a clutch mechanism adapted to prevent rotation of the disk in an opposite direction, and a pawl mounted upon said rotatable member and adapted to engage with said toothed disk.

HENRY F. CRANDALL.

Witnesses:
 FRED H. GRAPEE,
 B. C. WAIT.